United States Patent
Forte et al.

(10) Patent No.: US 9,487,643 B2
(45) Date of Patent: Nov. 8, 2016

(54) ADHESION TYRE RUBBER COMPOUND

(71) Applicant: BRIDGESTONE CORPORATION, Chuo-ku, Tokyo (JP)

(72) Inventors: Gianluca Forte, Rome (IT); Giancarlo Cossu, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/367,672

(22) PCT Filed: Dec. 24, 2012

(86) PCT No.: PCT/IB2012/057694
§ 371 (c)(1),
(2) Date: Jun. 20, 2014

(87) PCT Pub. No.: WO2013/093898
PCT Pub. Date: Jun. 27, 2013

(65) Prior Publication Data
US 2015/0307695 A1  Oct. 29, 2015

(30) Foreign Application Priority Data
Dec. 23, 2011  (IT) .............................. TO2011A1209

(51) Int. Cl.
| | |
|---|---|
| *C08K 5/17* | (2006.01) |
| *B60C 1/00* | (2006.01) |
| *C08K 5/00* | (2006.01) |
| *C08K 5/36* | (2006.01) |
| *C08L 9/06* | (2006.01) |
| *C08K 3/22* | (2006.01) |

(52) U.S. Cl.
CPC ................ *C08K 5/175* (2013.01); *B60C 1/00* (2013.01); *C08K 5/0025* (2013.01); *C08K 5/0091* (2013.01); *C08K 5/17* (2013.01); *C08K 5/36* (2013.01); *C08L 9/06* (2013.01); *C08K 2003/2296* (2013.01)

(58) Field of Classification Search
CPC  C08K 5/175; C08K 5/36; C08K 2003/2296; C08K 5/0025; C08K 5/0091; C08K 5/17; C08L 9/06; B60C 1/00
See application file for complete search history.

(56) References Cited

U.S. PATENT DOCUMENTS

| | | | |
|---|---|---|---|
| 1,783,216 A | 12/1930 | Boermann et al. | |
| 6,649,678 B1 | 11/2003 | Sandstrom | |
| 2005/0288448 A1 | 12/2005 | Tidow et al. | |
| 2008/0194760 A1* | 8/2008 | Hochi | B60C 1/0016 524/579 |
| 2011/0098404 A1 | 4/2011 | Kwag et al. | |

FOREIGN PATENT DOCUMENTS

| | | |
|---|---|---|
| GB | 711562 A | 7/1954 |
| GB | 971753 A | 10/1964 |

OTHER PUBLICATIONS

International Search Report of PCT/IB2012/057694, dated May 17, 2013.

* cited by examiner

*Primary Examiner* — Robert Jones, Jr.
(74) *Attorney, Agent, or Firm* — Sughrue Mion, PLLC

(57) ABSTRACT

A tire rubber compound having at least one cross-linkable, unsaturated-chain polymer base, and a curing system of at least sulphur, stearic acid, zinc oxide, and a chelating agent for complexing the zinc ion.

4 Claims, No Drawings

ADHESION TYRE RUBBER COMPOUND

CROSS REFERENCE TO RELATED APPLICATIONS

This application is a National Stage of International Application No. PCT/IB2012/057694 filed Dec. 24, 2012, claiming priority based on Italian Patent Application No. TO2011A001209, filed Dec. 23, 2011, the contents of all of which are incorporated herein by reference in their entirety.

TECHNICAL FIELD

The present invention relates to an improved-adhesion tyre rubber compound.

BACKGROUND ART

As is known, the curing agents commonly used in tyre rubber compounds comprise stearic acid and zinc oxide, which act as curing activators in a way that is still being researched.

Tests have shown, however, that stearic acid reacts with zinc oxide to form zinc stearate, which tends to migrate to the surface of the green compound to produce a surface phenomenon known as 'blooming'.

One of the main drawbacks of blooming is that it reduces the surface adhesion properties of the compound.

At the tyre building stage, organic-solvent-based adhesive compounds (known as cement) are currently used to effectively connect green compounds.

Recent regulations, however, have reduced the use of organic-solvent-based cements, thus forcing tyre manufacturers to seek out alternative effective compound-connecting solutions.

In this regard, it should be noted that adhesive resins have potentially negative effects in terms of hysteresis.

One possible solution is to enhance the surface adhesion of the compounds for connection, so as to avoid, or at least reduce, use of solvent-based cements and/or adhesive resins.

Achieving this depends on minimizing blooming, i.e. zinc stearate migration to the surface of the green compound.

A compound is therefore needed which, despite comprising stearic acid and zinc oxide as curing activators, prevents blooming and the adhesion issues resulting from it.

DISCLOSURE OF INVENTION

One object of the present invention is a tyre rubber compound comprising at least one cross-linkable, unsaturated-chain polymer base, and a curing system comprising at least sulphur, stearic acid, and zinc oxide; said compound being characterized in that said curing system comprises a chelating agent for complexing the zinc ion.

Preferably, the chelating agent has at least two carboxyl groups, at least one heteroatom, and a molecular weight of at least 170.

Preferably, the chelating agent is a compound of formula (I)

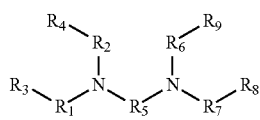

where:

$R_1$, $R_2$, $R_6$, $R_5$, $R_7$, which are the same or different, are each an alkyl group with 1 to 5 carbon atoms;

$R_3$, $R_4$, $R_8$, $R_9$, which are the same or different, are each a carboxyl group or an alkyl group with 1 to 5 carbon atoms; at least two of them being a carboxyl group.

Preferably, the chelating agent is EDTA or a chemical derived from EDTA.

Preferably, the tyre rubber compound comprises 0.1 to 5 phr of chelating agent.

Preferably, the tyre rubber compound comprises 0.1 to 10 phr of stearic acid, and 0.1 to 20 phr of zinc oxide.

Another object of the present invention is a tyre comprising a portion made from a rubber compound in accordance with the present invention.

Another object of the present invention is use of a chelating agent in the curing system of tyre rubber compounds; said chelating agent being such as to complex the zinc ion.

BEST MODE FOR CARRYING OUT THE INVENTION

For a clearer understanding of the invention, a number of non-limiting embodiments are described below purely by way of example.

EXAMPLES

A control compound (A) was produced, substantially corresponding to a conventional compound comprising a curing system with commonly used quantities of stearic acid and zinc oxide. And two compounds (B, C) in accordance with the invention were produced, comprising two different chelating agents.

Compounds A-C were produced using a standard procedure, which is of no relevance to the present invention. As shown in the procedure below, the chelating agent is added to the compound at a third mixing stage, together with the other curing system ingredients.

—Compound Preparation—

(First Mixing Stage)

A 230-270-liter tangential-rotor mixer was first loaded with the polymer base to a fill factor of 66-72%.

The mixer was operated at a speed of 40-60 rpm, and the resulting compound was unloaded on reaching a temperature of 140-160° C.

(Second Mixing Stage)

The compound from the previous stage was processed further in the mixer at a speed of 40-60 rpm and unloaded on reaching a temperature of 130-150° C.

(Third Mixing Stage)

The curing system, comprising sulphur, zinc oxide, stearic acid and possibly a chelating agent and accelerants, was added to the compound from the previous stage to a fill factor of 63-67%.

The mixer was operated at a speed of 20-40 rpm, and the resulting compound was unloaded on reaching a temperature of 100-110° C.

Table I shows the compositions in phr of the three compounds A-C.

TABLE I

|  | A | B | C |
|---|---|---|---|
| S-SBR | 100 | 100 | 100 |
| Carbon black | 34 | 34 | 34 |
| Accelerants | 0.6 | 0.6 | 0.6 |
| Adhesive resin | 4 | 4 | 4 |
| ZnO | 4 | 4 | 4 |
| Stearic acid | 3 | 1.5 | 1.5 |
| Nitro EDTA | — | 1.5 | — |
| EDTA | — | — | 1.5 |

The adhesive resin used was alkylphenolformaldehyde.

Each of the compounds produced was adhesion tested as per ASTM Standard D429. To assess the effects of any zinc stearate migration in the three compounds, adhesion testing was repeated at different compound storage times. More specifically, testing was performed 2 days, 20 days, and 90 days after the compound was produced.

Table II shows the adhesion values indexed to the compound values after two days' storage. After two days' storage, zinc stearate surface migration has not yet taken place, so compounds A-C all have the same adhesion levels.

TABLE II

|  | A | B | C |
|---|---|---|---|
| 2 days storage | 100 | 100 | 100 |
| 20 days storage | 127 | 116 | 148 |
| 90 days storage | 124 | 243 | 331 |

As shown in Table II, as storage time increases, adhesive resin migration increases adhesion, provided zinc stearate migration is prevented, i.e. compounds B and C in accordance with the invention show an increase in surface adhesion with respect to control compound A.

Table II also shows how the amount of adhesive resin in the compounds according to the invention can be reduced to achieve improvements in terms of hysteresis, as stated above.

Each of the compounds was also tested to determine its rheometric properties as per ASTM Standard D5289, and viscosity, as per ASTM Standard D6080. The results are shown in Table III.

TABLE III

|  | A | B | C |
|---|---|---|---|
| ML (dNm) | 0.99 | 1.17 | 1.22 |
| MH (dNm) | 7.81 | 7.82 | 7.85 |
| T10 (min) | 4.45 | 4.47 | 4.62 |
| T50 (min) | 8.77 | 7.23 | 7.51 |
| T90 (min) | 18.63 | 18.16 | 18.32 |

As shown clearly in Table III, the chelating agent in no way impairs curing of the compound, i.e. only affects the formation of zinc stearate, and in no way impairs the zinc ion curing activator function.

The invention claimed is:

1. A method for producing a tyre rubber compound comprising a mixing step wherein a curing system is added and mixed to a compound being produced; said curing system comprising at least sulphur, stearic acid, and zinc oxide; said method being characterized in that a chelating agent for complexing zinc ion is added and mixed to the compound being produced together with said curing system in said mixing step; said chelating agent being EDTA or a chemical derived from EDTA, and said chelating agent chelates with zinc ions in said mixing step.

2. A method as claimed in claim 1, characterized by comprising 0.1 to 5 phr of said chelating agent.

3. A method as claimed in claim 1, characterized by comprising 0.1 to 10 phr of stearic acid, and 0.1 to 20 phr of zinc oxide.

4. A tyre rubber compound made according to the method as claimed in claim 1.

* * * * *